April 8, 1969 P. S. WARWICK 3,438,007

MAGNETIC DOMAIN PROPAGATED WORD RECOGNIZER

Filed March 14, 1966 Sheet 1 of 2

INVENTOR
P. S. WARWICK
BY Herbert M. Shapiro
ATTORNEY

United States Patent Office 3,438,007

Patented Apr. 8, 1969

3,438,007

MAGNETIC DOMAIN PROPAGATED WORD RECOGNIZER

Peter S. Warwick, Middletown, N.J., assignor to Bell Telephone Laboratories, Incorporated, New York, N.Y., a corporation of New York Filed Mar. 14, 1966, Ser. No. 533,910
Int. Cl. G11b 5/62
U.S. Cl. 340—174 9 Claims This invention relates to information processing devices and, more particularly, to devices for recognizing characteristic information.

Devices for recognizing characteristic information, often termed "word recognizers," are in widespread use in all types of communication and data processing systems. For example, in communication systems where a plurality of receivers are potentially capable of receiving a communication, each receiver includes, advantageously, a word recognizer for detecting a characteristic word designating the receiver to which the communication is addressed. In the absence of the characteristic word (address) designating a particular receiver, that receiver is disabled from receiving the communication. This transmission medium is competitive with switching (tree) logic systems, primarily, to the extent that inexpensive word recognizers become available. Moreover, tree logic systems are impractical in certain instances such as in remote radio telephone receiver systems.

An object of this invention is to provide a new and novel relatively inexpensive word recognizer.

The foregoing and further objects of this invention are realized in one embodiment thereof wherein a magnetic domain wall device is turned to account. A magnetic domain wall device comprises a magnetic medium, typically a magnetic wire having an initial magnetization, in a portion of which a reverse (magnetized) domain is provided in response to a first field in excess of a nucleation threshold and through which reverse domains are propagated in response to a second field in excess of a propagation threshold and less than the nucleation threshold. Typically, the first field is provided during a write operation. The second fields are provided thereafter in a step-along manner whereby a four-phase driver alternately pulses two propagation conductors including interleaved and (usually) alternately sensed coils coupled to the magnetic wire. Such a device is described in Patent No. 2,919,432, issued Dec. 29, 1959, to K. D. Broadbent.

In accordance with the present invention, first and second four-phase drivers and two sets of propagation conductors are coupled to coded positions along, illustratively, a domain wall wire. In response to a positive input pulse (binary "1" input), the first driver is activated to supply a sequence of second (propagation) fields in coded portions of the domain wall wire. In response to a negative input pulse (binary "0" input), the second driver is activated to supply those propagation fields in different coded positions of the domain wall wire. Only if the proper sequence of binary ones and zeros appears at the inputs to the device will a reverse domain, generated during a previous write operation, be propagated to a remote output position for detection.

Accordingly, a feature of this invention is a domain wall device including first and second propagating means for providing propagation pulse sequences in coded positions of a domain wall medium in response to first and second input signals respectively.

The foregoing and further objects and features of this invention will be more fully understood from the detailed discussion rendered in conjunction with the accompanying drawing wherein.

Figure 1:
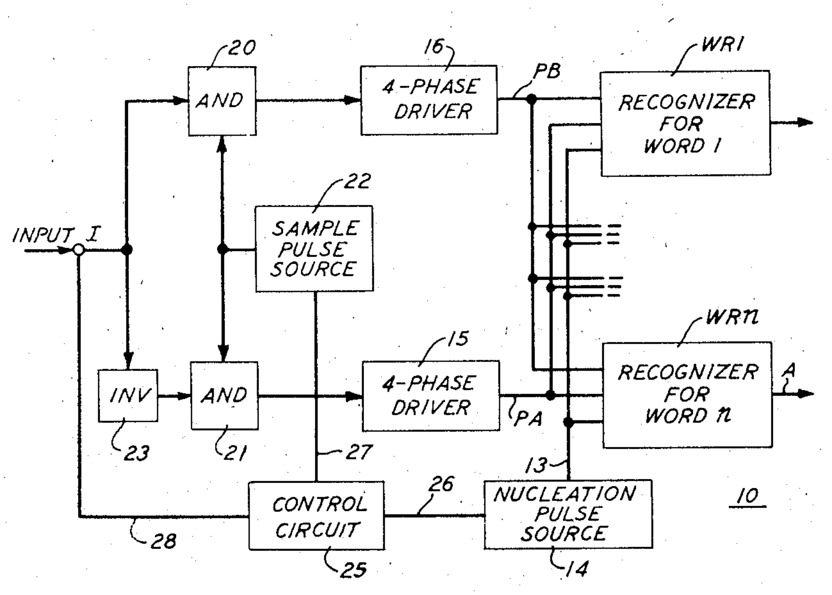
FIG. 1 is a schematic illustration of a recognizer circuit in accordance with this invention.

FIG. 1 shows a recognizer circuit arrangement 10, in accordance with this invention, wherein a plurality of word recognizers, WR1, WR2, . . . WR*n*, are arranged in parallel. Each word recognizer is represented in block diagram form in FIG. 1 and the details for a representative word recognizer are shown in FIG. 2.

Figure 2:
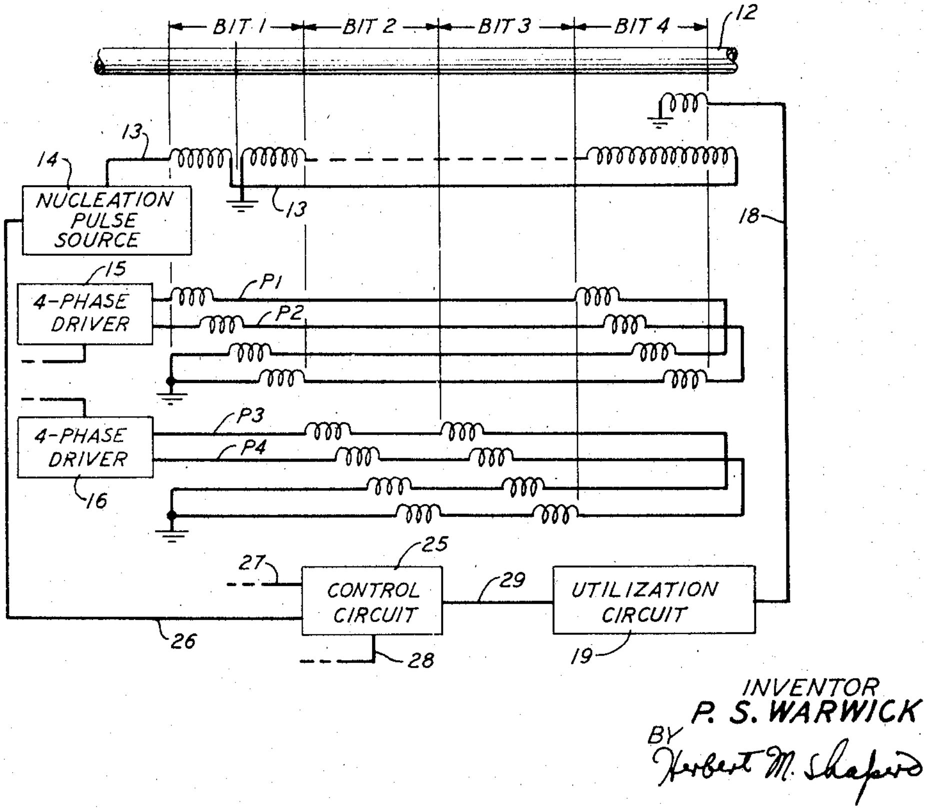
FIGS. 2 through 6 are schematic illustrations of portions of the recognizer circuit of FIG. 1.

An understanding of the representative word recognizer of FIG. 2 is helpful for an understanding of the circuit of FIG. 1, and, accordingly, the former is described first. Specifically, each word recognizer of FIG. 1 includes a magnetic wire 12 of the type described hereinbefore. A nucleation conductor 13 couples wire 12 in a first sense along an input portion thereof and in a second sense along the remainder thereof as shown in FIG. 2. Conductor 13 is connected between a nucleation pulse source 14 and ground. Wire 12 is assumed illustratively to include four bit positions as designated. It is noted that the input position is approximately one-half of the length of bit 1, as designated.

Wire 12 is also coupled by first, second, third, and fourth propagation conductors P1, P2, P3, and P4. Conductors P1 and P2 couple bit 1 and bit 4 of wire 12. It is noted that the couplings of conductors P1 and P2 interleave and that adjacent couplings, viewed from left to right, essentially alternate in sense. The alternation of the sense of the couplings is not necessary for propagating a single domain wall as is well known. Conductors P1 and P2 are connected between a four-phase driver 15 and ground. This connection is represented symbolically by a line PA in FIG. 1. Propagation conductors P3 and P4 similarly couple bits 2 and 3 of wire 12 and are connected between a four-phase driver 16 and ground. Such a connection is represented symbolically by a line PB in FIG. 1.

An output conductor 18 is coupled to an output portion of wire 12 for detecting the arrival of a domain wall there. Conductor 18 is connected between a utilization circuit 19 and ground.

The various couplings between the drive conductors and wire 12 are shown as coils spaced apart from wire 12 for clarity. Such coils are to be understood to couple wire 12 and, in one convenient arrangement, wrap about wire 12 at the positions shown.

Four-phase drivers 16 and 15 are connected to outputs of AND circuits 20 and 21, respectively, as shown in FIG. 1. One input of AND circuit 20 is connected to an input I. A second input of AND circuit 20 is connected to a sample pulse source 22. Similarly, an input of AND circuit 21 is connected to the input I but through an inverter 23. The second input to AND circuit 21 is connected to sample pulse source 22.

The input I in the circuit of FIG. 1 comprises, illustratively, positive and negative pulses corresponding to binary ones and zeros respectively. The appearance of a positive input concurrently with a sample pulse from source 22 activates AND circuit 20 which activates four-phase driver 16. In turn, driver 16 provides a pulse sequence comprising, illustratively, a positive pulse on conductor P3, a positive pulse on conductor P4, a negative pulse on conductor P3, and a negative pulse on conductor P4 for advancing a domain wall present in a corresponding portion of wire 12. If a negative input pulse is received concurrently with a sample pulse from source 22, inverter 23 inverts the pulse and AND circuit 21 is activated. Four-phase driver 15, consequently, is activated and a corresponding pulse sequence is applied to conductors P1 and P2 similarly providing fields for advancing the domain wall in different portions of wire 12. It is clear that a positive input pulse is inverted by inverter 23 and thus does not enable AND circuit 21 while a negative pulse, of course, does not enable AND circuit 20. Whether or not a domain wall, of a reverse magnetized domain, at the input position in wire 12 is advanced to the output position then depends on the positions of the couplings between conductors P1, P2, P3, and P4 with wire 12 and also depends on the sequence of pulses provided at the input I of FIG. 1 as will become clear.

Nucleation pulse source 14 as well as sample pulse source 22 are connected to a control circuit 25 via conductors 26 and 27, respectively, providing means for synchronizing the operation. Control circuit 25 is responsive to input signals and is connected to the input I via a conductor 28 to this end. Utilization circuit 19 for the representative word recognizer of FIG. 2 is shown connected to control circuit 25 via a conductor 29.

The various pulse sources, drivers, and other circuits herein may be any such elements capable of operating in accordance with this invention.

The representative word recognizer of FIG. 2 is chosen to be four bits long. The word which that recognizer is designed to recognize is determined by the arrangement of the couplings between wire 12 and conductors P1, P2, P3, and P4. Conductors P1 and P2 couple wire 12 to provide (when pulsed) pulse sequences to move a reverse domain from the bit 1 position to the bit 2 position and from the bit 4 position past the output coupling. These couplings correspond to negative pulses (binary zeros) in the corresponding incoming four bit code. Conductors P3 and P4, on the other hand, couple the bit 2 and bit 3 positions to similarly advance a reverse domain from those to next succeeding positions. These couplings correspond to binary ones in the incoming code. Thus, the illustrative arrangement of couplings between conductors P1, P2, P3, and P4 with wire 12 code wire 12 to recognize a 0110 character.

The operation of the circuit of FIG. 1 with the representative recognizer of FIG. 2 will now be described for receiving a correct input 0110 and then briefly for receiving an incorrect input 1110.

Figure 3:
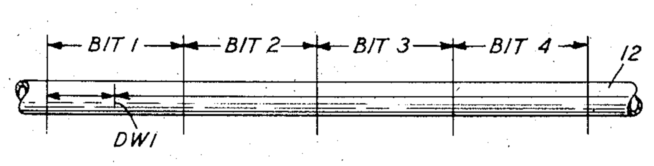
Figure 4:

Initially, a negative input pulse (binary zero) is received at the input I of the circuit of FIG. 1 from some external source not shown. The negative input activates control circuit 25 which, in turn, activates nucleation pulse source 14 for pulsing conductor 13 (FIG. 2) thus providing a domain wall DW1 at the input position in wire 12. The nucleation pulse is designated PN in the pulse diagram of FIG. 7. The resulting domain wall DW1 is shown in FIG. 3 as a vertical line between an arrow directed to the right and an arrow directed to the left representing a reversed magnetized domain and an initialized magnetization condition respectively. The negative input pulse is inverted by inverter 23 for enabling AND circuit 21 (FIG. 1). Sample pulse source 22 activates AND circuit 21, at a time $t1$ during the input pulse, under the control of control circuit 25. AND circuit 21, in response, activates four-phase driver 15 for providing one four-phase propagation pulse sequence for advancing domain wall DW1 to the bit 2 position in wire 12. The sample pulse is designated PS1 and the propagation pulses are designated +P1, +P2, −P1, and −P2 in FIG. 7. The domain wall is now in the bit 2 position, as shown in FIG. 4.

Figure 5:
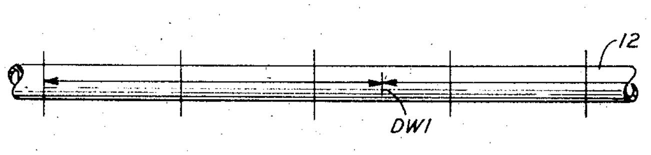
Figure 7:
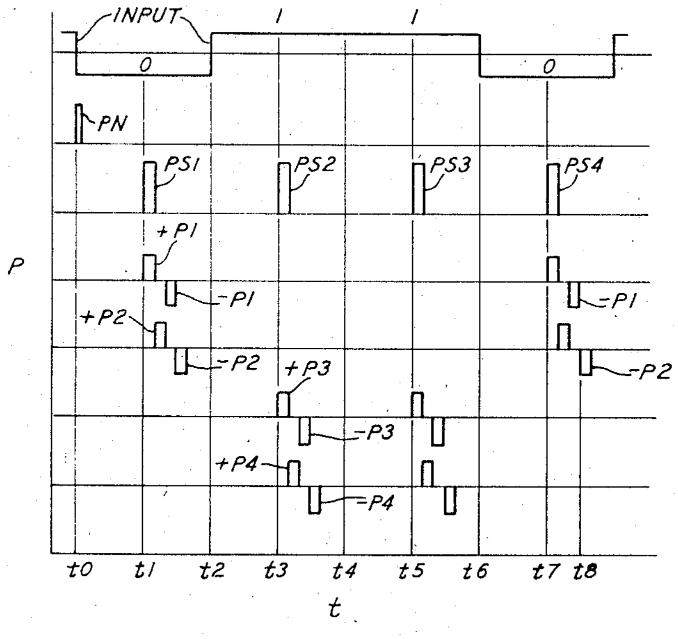
FIG. 7 is a pulse diagram of the operation of the recognizer circuit of FIG. 1.

A second input pulse is received at a time designated $t2$ in FIG. 7. This pulse is positive and corresponds to a binary one. Sample pulse source 22 provides a second sample pulse PS2 under the control of control circuit 25 in response to that input pulse. The input pulse enables AND circuit 20 which, then, is activated by sample pulse PS2. Consequently, four-phase driver 16 is activated for providing a single four-phase propagation sequence. The second sample pulse and the corresponding propagation sequence of pulses +P3, +P4, −P3, and −P4 are shown initiated at time $t3$ in FIG. 7. The domain wall is advanced to the bit 3 position as shown in FIG. 5.

Figure 6:
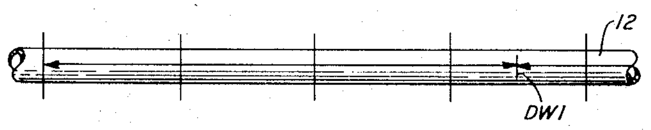

A third (positive) input pulse (level) is received (established) at a time designated $t4$ in FIG. 7. Sample pulse source 22 provides a third sample pulse PS3 under the control of control circuit 25. In response, driver 16 is again activated and the propagation pulse sequence, initiated at time $t3$, is again initiated at a time designated $t5$ in FIG. 7. Consequently, the domain wall is advanced to the bit 4 position as shown in FIG. 6.

A fourth input pulse is received at a time designated $t6$ in FIG. 7. In accordance with the assumed input code, this pulse is negative corresponding to a binary zero. Consequently, AND circuit 21 is enabled, as discussed hereinbefore, and then activated by a corresponding sample pulse PS4 from pulse source 22 under the control of control circuit 25. The sample pulse and the corresponding propagation pulse sequence are shown initiated at a time designated $t7$ in FIG. 7. The propagation pulses are applied to conductors P1 and P2 as were those pulses initiated at time $t1$. At a time designated $t8$ in FIG. 7, domain wall DW1 enters the portion of wire 12 coupled by output conductor 18 inducing a pulse therein for detection by utilization circuit 19 under the control of control circuit 25.

A proper input code, illustratively, provides an output during the fourth phase (pulse −P2 at time $t8$) of the fourth propagation sequence. It will now be demonstrated that an incorrect input code does not provide an output pulse.

The assumed incorrect input code is 1110. It is clear that a binary one is represented as a positive input pulse which provides propagation pulses as described in connection with the operation at time $t3$ above. Those pulses cause the movement of domain wall DW1 from the bit 2 or bit 3 positions to the next succeeding position. The domain wall DW1, however, is initially in the bit 1 position and, consequently, remains unmoved. If a mismatch between the incoming code and the coded couplings between wire 12 and the various propagation conductors occurs, the domain wall is delayed one bit position. The sample pulses, however, cease after the last bit of the incoming character under the control of control circuit 25 and do not resume until a next character is initiated. The domain wall DW1, therefore, remains in wire 12 short of that position coupled by the output conductor. Each new character, of course, is accompanied by a nucleation pulse PN (see time $t0$ of FIG. 7) which initializes wire 12 except for the input portion. Consequently, domain wall DW1 is destroyed and never provides an output pulse unless a correct character is received.

In the parallel recognized arrangement of FIG. 1, each recognizer is coded to respond to a different input character. If FIG. 2 represents recognizer WR1, an input code 0110 provides an output in the utilization circuit 19 corresponding to that recognizer. If recognizer WR$n$ is coded to recognizer input character 1110, then an output is provided in a corresponding utilization circuit (not shown) indicated in FIG. 1 by the arrow A directed to the right there.

The various nucleation and propagation driver circuits and conductors are advantageously shared by the recognizers of FIG. 1, and a domain wall is advantageously provided simultaneously at an input position of each.

What has been described is considered to be only illustrative of the principles of this invention and it is to be understood that various and numerous other arrangements may be devised by one skilled in the art without departing from the spirit and scope thereof.

What is claimed is:

1. A recognizer circuit comprising a magnetic medium of a material capable of sustaining a stable magnetized condition including a domain wall therein in response to a first field in excess of a nucleation threshold and of moving that domain wall in response to a second field in excess of a propagation threshold and less than said nucleation threshold, means for providing said first field in a first position of said medium, first and second propagation means each including a pair of conductors coupled to said medium in a manner for providing step-along said second fields in first and second coded portions of said medium, said first and second propagation means also including first and second four-phase drivers responsive to first and second input pulse respectively for so pulsing the corresponding conductor pairs.

2. A recognizer circuit comprising a magnetic wire, first and second propagation means each comprising first and second interleaved conductors coupled to said wire in a manner to provide step-along fields in coded positions when pulsed in a four-phase manner, said first and second propagation means also comprising first and second four-phase drivers responsive to positive and negative pulses respectively for alternately pulsing corresponding first and second conductors in a four-phase manner when activated thus providing said step-along fields in corresponding said coded positions of said wire, means responsive to input signals for selectively providing a domain wall in a first position of said wire, and means for detecting the arrival of said domain at a second position remote from said first position, said domain wall arriving at said second position at a prescribed time only when the sequence of positive and negative pulses corresponds to the coded positions in said wire for successively advancing the domain without delay.

3. A recognizer circuit in accordance with claim 2 wherein said means for providing a domain wall includes a conductor coupled to said first position of said wire in a first sense and coupled to the remainder of said wire in a second sense.

4. A recognizer circuit in accordance with claim 3 wherein said first and second propagation means includes first and second gating circuits respectively and means responsive to positive and negative input signals for enabling said first and second gating circuits respectively.

5. A recognizer circuit in accordance with claim 4 including means responsive to positive and negative input signals for activating the so-enabled gating circuit.

6. A recognizer circuit in accordance with claim 4 comprising a plurality of magnetic wires wherein said first and second conductors of each of said propagation means couples different coded positions of each of said wires.

7. A recognizer circuit in accordance with claim 6 wherein said means for providing a domain wall includes a conductor coupled to said first position of each of said plurality of magnetic wires in a first sense and coupled to the remainder of each of said wires in a second sense.

8. A recognizer circuit in accordance with claim 7 including output means coupled to a second position in each of said wires for selective detecting the arrival of a domain wall there.

9. In a domain wall wire recognizer circuit including means providing a domain wall at an input position of said wire, first and second propagation means including first and second pairs of interleaved conductors respectively for providing step-along fields at coded positions along said wire when pulsed in a four-phase manner, and means responsive to first and second input signals respectively for pulsing corresponding first and second pairs of conductors in a four-phase manner.

References Cited

UNITED STATES PATENTS

| | | | |
|---|---|---|---|
| 3,092,813 | 6/1963 | Broadbent | 340—174 |
| 3,351,922 | 11/1967 | Snyder | 340—174 |
| 3,241,127 | 3/1966 | Snyder | 340—174 |
| 3,334,343 | 8/1967 | Snyder | 340—174 |

BERNARD KONICK, *Primary Examiner.*

P. SPERBER, *Assistant Examiner.*